(12) United States Patent
Sugahara

(10) Patent No.: US 11,352,221 B2
(45) Date of Patent: Jun. 7, 2022

(54) POST-PROCESSING METHOD FOR WORKPIECE, MACHINING SYSTEM, AND MANAGEMENT SYSTEM

(71) Applicant: Fanuc Corporation, Yamanashi (JP)

(72) Inventor: Hirofumi Sugahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 452 days.

(21) Appl. No.: 16/510,099

(22) Filed: Jul. 12, 2019

(65) Prior Publication Data

US 2020/0024082 A1 Jan. 23, 2020

(30) Foreign Application Priority Data

Jul. 20, 2018 (JP) .............................. JP2018-136663
Jan. 22, 2019 (JP) .............................. JP2019-008495

(51) Int. Cl.
*B65G 47/90* (2006.01)
*B65G 69/20* (2006.01)

(52) U.S. Cl.
CPC ........... *B65G 47/905* (2013.01); *B65G 69/20* (2013.01)

(58) Field of Classification Search
CPC ...... B65G 47/905; B65G 69/20; B23Q 11/10; B23Q 11/0075; B23Q 11/005; B23Q 15/02
See application file for complete search history.

(56) References Cited

U.S. PATENT DOCUMENTS

| 4,980,532 A * | 12/1990 | Morishita ................ B23H 7/20 |
| | | 219/69.13 |
| 9,802,720 B2 * | 10/2017 | Baylor ...................... B65B 5/06 |
| 10,870,547 B2 * | 12/2020 | Sugahara ........... B23Q 11/0075 |
| 2006/0151137 A1 | 7/2006 | Kuroki et al. |
| 2013/0104715 A1 | 5/2013 | Huang et al. |
| 2015/0343585 A1 * | 12/2015 | Weixler ............. B23Q 11/0075 |
| | | 409/1 |

(Continued)

FOREIGN PATENT DOCUMENTS

EP 1649951 A1 4/2006
EP 2289650 A1 3/2011

(Continued)

OTHER PUBLICATIONS

Yamamura, Hidemasa; Notice of Reasons for Refusal; Japanese Patent Application No. 2019-008495; dated May 18, 2021; 4 pages.

(Continued)

*Primary Examiner* — William R Harp
(74) *Attorney, Agent, or Firm* — Shackelford, Bowen, McKinley & Norton, LLP

(57) ABSTRACT

In a post-processing method for a workpiece, a workpiece machined by a machining device is conveyed by a robot, from the machining device to a post-processing device, information regarding a state, at the machining device, of the workpiece after machining is acquired, a processing time for post-processing of the workpiece by the post-processing device is determined by a control device on the basis of the information regarding the state of the workpiece after machining, and the post-processing is performed on the workpiece by the post-processing device for just the processing time that is determined.

19 Claims, 5 Drawing Sheets

(56) References Cited

U.S. PATENT DOCUMENTS

| | | | |
|---|---|---|---|
| 2018/0059641 | A1 | 3/2018 | Morimoto |
| 2018/0065223 | A1 | 3/2018 | Suzuki et al. |
| 2018/0174658 | A1 | 6/2018 | Kikuchi |

FOREIGN PATENT DOCUMENTS

| | | | |
|---|---|---|---|
| EP | 2292353 A1 | 3/2011 | |
| JP | H06-045310 A | 2/1994 | |
| JP | H07-223061 A | 8/1995 | |
| JP | H08-267328 A | 10/1996 | |
| JP | H09-122548 A | 5/1997 | |
| JP | H10-118884 A | 5/1998 | |
| JP | 2000-072221 A | 3/2000 | |
| JP | 2000-135652 A | 5/2000 | |
| JP | 2000-138144 A | 5/2000 | |
| JP | 2004-057862 A | 2/2004 | |
| JP | 2005-349396 A | 12/2005 | |
| JP | 2012-213838 A | 11/2012 | |
| JP | 5175971 B1 | 4/2013 | |
| JP | 2015-040342 A | 3/2015 | |
| JP | 2015-136706 A | 7/2015 | |
| JP | 2018-032142 A | 3/2018 | |
| JP | 2018-097723 A | 6/2018 | |
| WO | WO-2016139743 A1 | 9/2016 | |

OTHER PUBLICATIONS

Yamamura, Hidemasa; Notice of Reasons for Refusal; Japanese Patent Application No. 2019-008495; dated Dec. 22, 2020; 3 pages.
Industrial Property Cooperation Center; Search Report by Registered Search Organization; Japanese Patent Application No. 2019-008495; dated Dec. 11, 2020; 13 pages.

* cited by examiner

POST-PROCESSING METHOD FOR WORKPIECE, MACHINING SYSTEM, AND MANAGEMENT SYSTEM

CROSS-REFERENCE TO RELATED APPLICATIONS

This application claims the benefit of Japanese Patent Application No. 2018-136663 and Japanese Patent Application No. 2019-008495, the content of which are incorporated herein by reference.

TECHNICAL FIELD

The present invention relates to a post-processing method for a workpiece, a machining system, and a management system.

BACKGROUND ART

After a workpiece is machined by a machining device, post-processing such as air blow is performed on the workpiece (for example, see PTLs 1 to 3).

CITATION LIST

Patent Literature

{PTL 1}
the Publication of Japanese Patent No. 5175971
{PTL 2}
Japanese Unexamined Patent Application, Publication No. 2012-213838
{PTL 3}
Japanese Unexamined Patent Application, Publication No. 2004-057862

SUMMARY OF INVENTION

An aspect of the present invention is a post-processing method for a workpiece including: conveying, by a robot, a workpiece machined by a machining device, from the machining device to a post-processing device; acquiring information regarding a state, at the machining device, of the workpiece after machining; determining, by a control device, a processing time for post-processing of the workpiece by the post-processing device, on a basis of the information regarding the state of the workpiece after machining; and performing the post-processing on the workpiece by the post-processing device for just the processing time that is determined.

Another aspect of the present invention is a machining system including: a machining device that machines a workpiece; a post-processing device that performs post-processing on the workpiece that is machined by the machining device; a robot that conveys the workpiece that is machined, from the machining device to the post-processing device; and a control device that controls the post-processing device and the robot, where the control device acquires information regarding a state, at the machining device, of the workpiece after machining, from the machining device, determines a processing time for post-processing of the workpiece on a basis of the information regarding the state of the workpiece after machining, and causes the post-processing device and the robot to perform the post-processing on the workpiece for just the processing time that is determined.

Another aspect of the present invention is a management system including: a plurality of machining systems including respective control devices; and a higher-level control system that is capable of communicating with each of the control devices of the plurality of machining systems, where each of the plurality of machining systems includes a machining device that machines a workpiece, a post-processing device that performs post-processing on the workpiece that is machined by the machining device, a robot that conveys the workpiece that is machined, from the machining device to the post-processing device, and the control device that controls the post-processing device and the robot, the control device of at least one of the machining systems includes a learning unit that performs learning to optimize a processing time for the post-processing of the workpiece, on a basis of information regarding a state of the workpiece after machining, and a state of the workpiece after the post-processing, and an output unit that outputs a result of the learning, and the higher-level control system accumulates the result of the learning received from the control device of the at least one of the machining systems.

DESCRIPTION OF EMBODIMENTS

Hereinafter, a machining system 10 and a post-processing method for a workpiece according to an embodiment of the present invention will be described with reference to the drawings.

Figure 1:
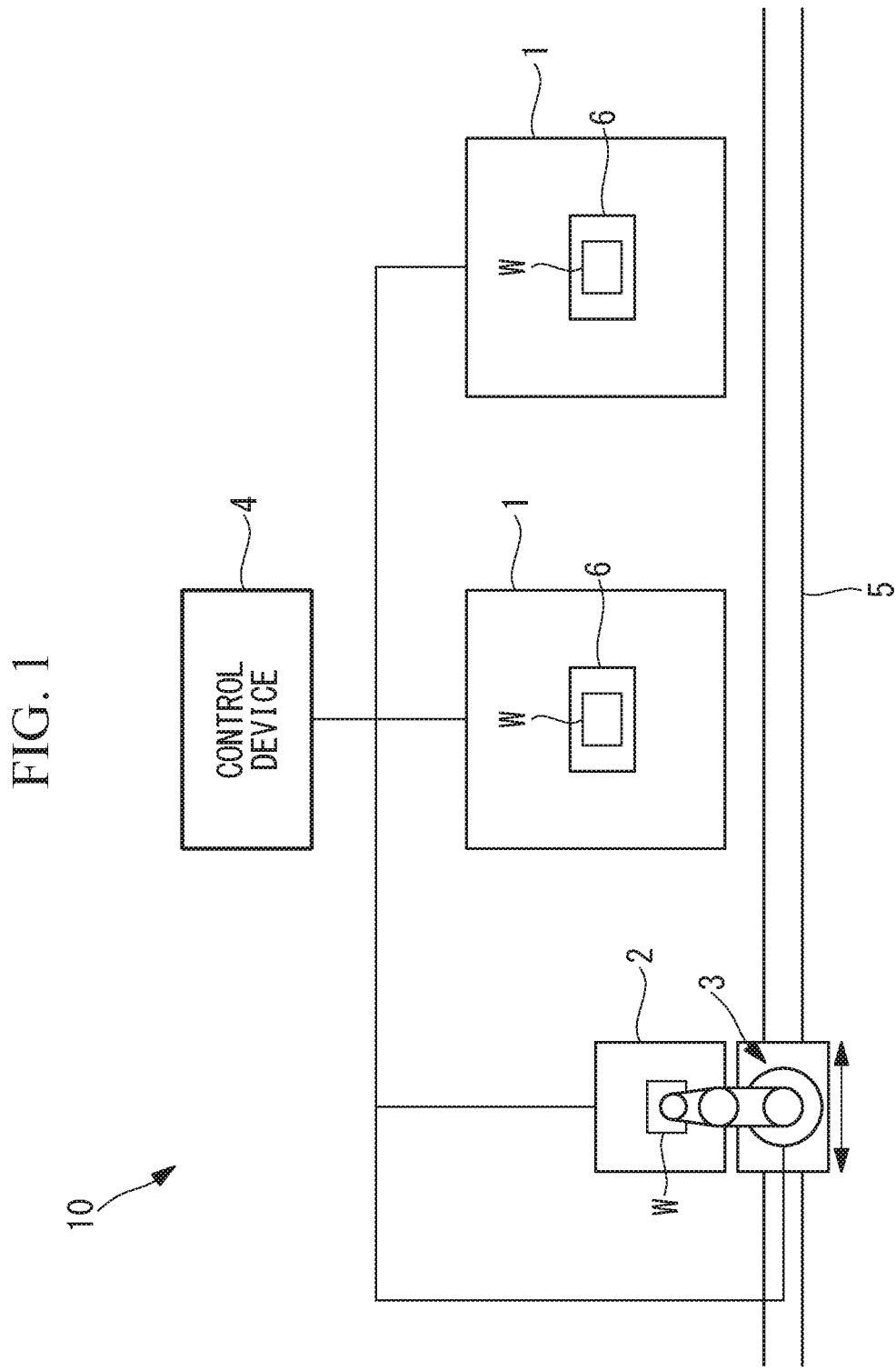
FIG. 1 is a schematic plan view showing an overall configuration of a machining system according to an embodiment of the present invention.

As shown in FIG. 1, the machining system 10 according to the present embodiment includes a plurality of machining devices 1, an air-blowing device (a post-processing device) 2, a robot 3, and a control device 4. The plurality of machining devices 1 and the air-blowing device 2 are arranged along a rail 5.

For example, the robot 3 is a 6-axis articulated robot, and includes a hand for grasping a workpiece W. The robot 3 moves along the rail 5, and supplies a workpiece W to each machining device 1 and picks up a workpiece W from each machining device 1. Furthermore, the robot 3 conveys, to the air-blowing device 2, a machined workpiece W picked up from the machining device 1.

Figure 2:
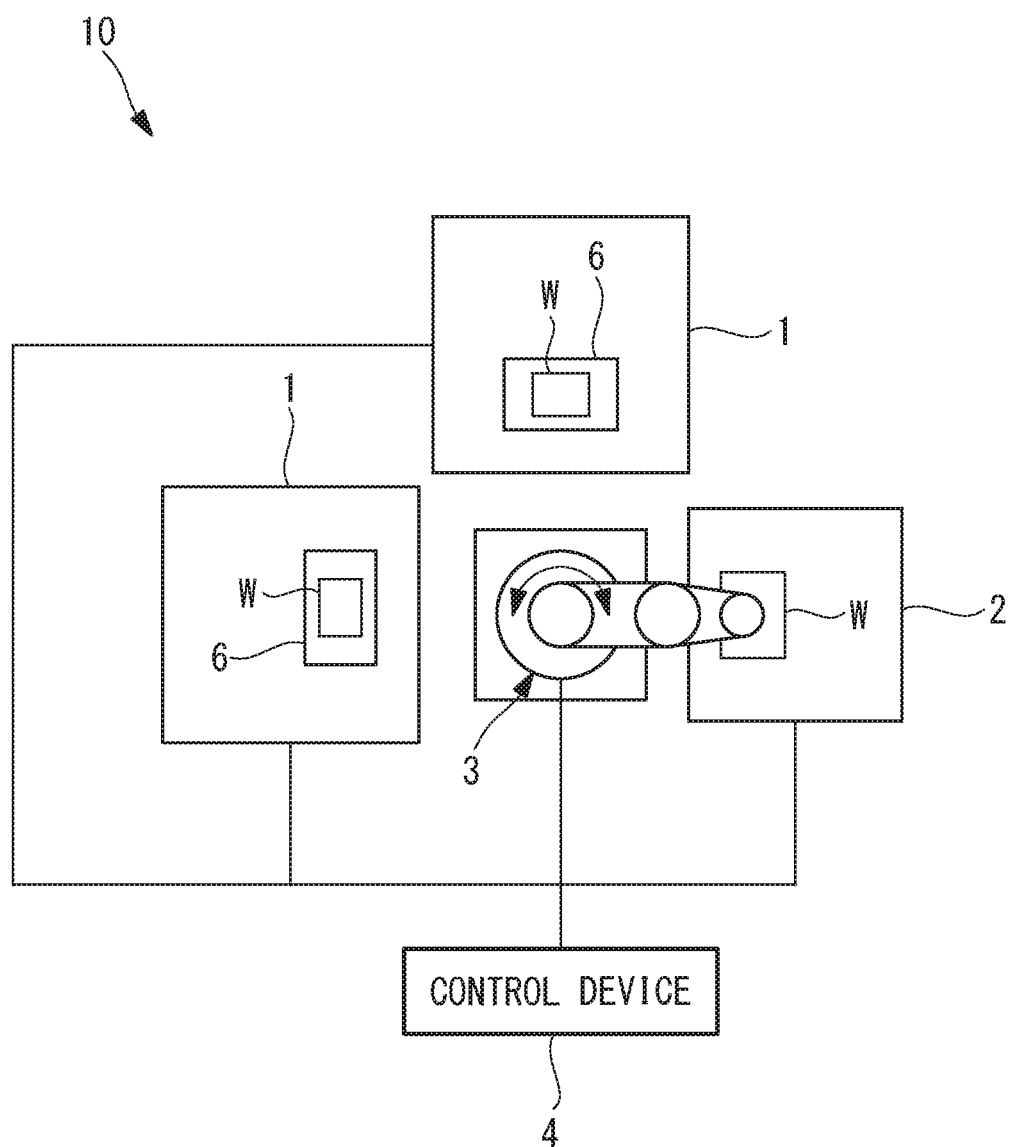
FIG. 2 is a schematic plan view showing an overall configuration of a modification of the machining system in FIG. 1.
Figure 3:
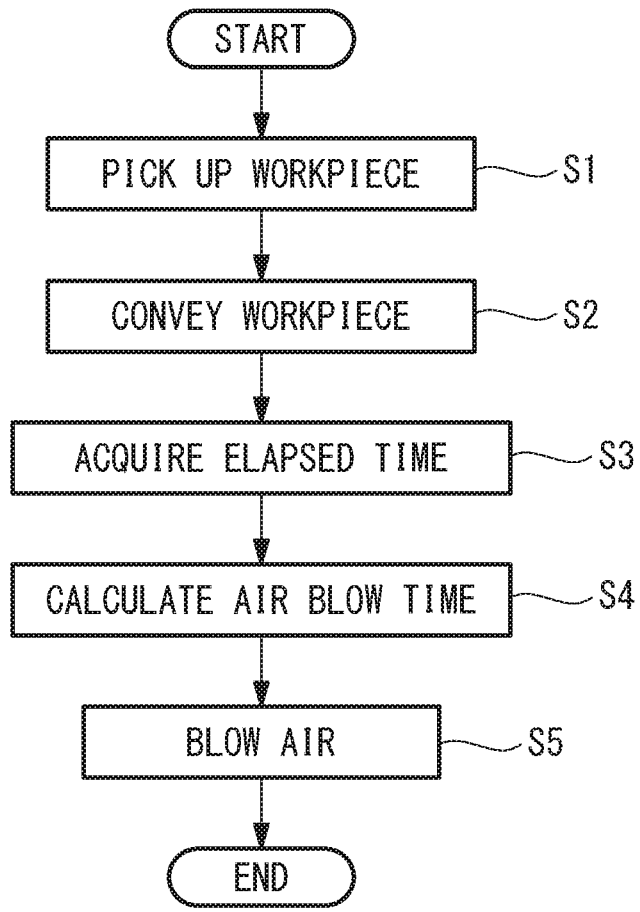
FIG. 3 is a flowchart showing a post-processing method for a workpiece according to the embodiment of the present invention.

As shown in FIG. 2, the robot 3 may convey a workpiece W from the machining device 1 to the air-blowing device 2 by swiveling in a horizontal direction. In the machining system 10 in FIG. 2, the plurality of machining devices 1 and the air-blowing device 2 are arranged around the robot 3. In FIGS. 1 and 2, each machining device 1 may include an air-blowing device for blowing air onto the workpiece W.

The machining device 1 is a machine tool for cutting the workpiece W. The machining device 1 machines the workpiece W which is fixed on a table 6, by a tool such as a drill or an endmill. During machining by the tool, cutting fluid is supplied to the workpiece W. The machining device 1 measures an elapsed time T from end of machining of the workpiece W by the tool to pick-up of the workpiece W by the robot 3. Measurement of the elapsed time T is performed by a control unit (not shown) of the machining device 1, for example.

The air-blowing device 2 blasts air toward the workpiece W which is grasped by the robot 3. Cutting fluid attached to the workpiece W is blown off by the air.

The control device 4 is connected to the plurality of machining devices 1, the air-blowing device 2, and the robot 3. The control device 4 includes a control unit including a processor, and a storage unit including a non-volatile storage, a ROM, a RAM and the like. The storage unit stores control programs for controlling the air-blowing device 2 and the robot 3. The control unit transmits control signals to the air-blowing device 2 and the robot 3 according to the programs. The air-blowing device 2 and the robot 3 operate according to the control signals from the control device 4.

The control device 4 may be a cell control device for managing and controlling the entire machining system 10. The cell control device may be connected to the machining devices 1, the air-blowing device 2, and the robot 3 over the Internet.

The robot 3 may be controlled by its control device, and each machining device 1 may be controlled by its control device. In this case, the control device of the robot 3 controls the robot 3 according to a robot control program, and the control device of each machining device 1 controls the machining device 1 and the air-blowing device 2 according to machining device control programs.

The control device of the robot 3 and the control device of each machining device 1 transmit information regarding control, detection information, and the like to the control device 4. Information held by the control device 4 is transmitted to the control device of the robot 3 and the control device of machining device 1. Signals may be transmitted from the control device 4 to the control device of the robot 3 and the control device of each machining device 1, and control of the robot 3 or the machining device 1 by the respective control device may be performed according to the signal.

The control device 4 causes the robot 3 to perform supply of the workpiece W to the machining device 1 and pick-up of the workpiece W from the machining device 1. For example, supply and pick-up of the workpiece W are performed in response to request signals issued from the machining device 1 to the control device 4.

After the workpiece W is picked up from the machining device 1, the control device 4 causes the robot 3 to move to in front of the air-blowing device 2. Furthermore, the control device 4 acquires the elapsed time T from the machining device 1 which picked up the workpiece W. The control device 4 determines an air blow time (a processing time) A by the air-blowing device 2 in such a way that the air blow time A is more reduced as the elapsed time T is increased.

Next, the control device 4 controls the air-blowing device 2 and the robot 3, and causes air to be blown onto the workpiece W grasped by the robot 3 for just the air blow time A.

For example, the control device 4 calculates the air blow time A by the following equation.

$$A = B - C \times D$$

Here, B is a predetermined maximum air blow time. C is a cutting fluid reduction coefficient. D is the elapsed time T. Cutting fluid attached to the workpiece gradually decreases by automatically flowing off the workpiece W. The coefficient C is set on the basis of an amount of reduction in cutting fluid per unit time.

Next, an operation of the machining system 10 will be described.

The control device 4 causes the robot 3 to supply the workpiece W to the machining device 1. Next, machining of the workpiece W by the machining device 1 is started.

When machining is finished, the control device 4 causes the robot 3 to pick up the workpiece W from the machining device 1 (step S1), and causes the robot 3 grasping the workpiece W to move from in front of the machining device 1 to in front of the air-blowing device 2 (step S2). Furthermore, the control device 4 acquires the elapsed time T from the machining device 1 (step S3), and determines the air blow time A on the basis of the elapsed time T (step S4).

Next, the control device 4 causes the air-blowing device 2 and the robot 3 to perform air blow on the workpiece W by the air-blowing device 2 for just the air blow time A (step S5).

The elapsed time T when the workpiece W waits at the machining device 1, from end of machining to pick-up, is different for each workpiece W or for each machining device 1. For example, when machining conditions or machining contents are different, a machining time is different for each workpiece W or for each machining device 1, and the elapsed time T is thereby varied. Moreover, a time from end of machining to when the robot 3 heads to pick up the workpiece W is varied depending on a task state of the robot 3. The longer the elapsed time T, the more reduced the amount of cutting fluid attached to the workpiece W at a time point of pick-up of the workpiece W from the machining device 1.

According to the present embodiment, the air blow time A is determined on the basis of the elapsed time T in such a way that the longer the elapsed time T when the workpiece W waits at the machining device 1, from end of machining to pick-up, the shorter the air blow time A becomes. Accordingly, the air blow time A is reduced in a case where the amount of cutting fluid attached to the workpiece W is small. By optimizing the air blow time A in the above manner according to the state of the workpiece W picked up from the machining device 1, air blow may be prevented from being performed longer than necessary, and a task efficiency may be increased and a cycle time may be reduced.

In the present embodiment, the elapsed time T from end of machining to pick-up is acquired as information regarding the state, at the machining device 1, of the workpiece W after machining, but instead or together with such information, the air blow time at the machining device 1 may be acquired.

In the case of the machining device 1 including an air-blowing function, air is blown onto the workpiece W at the machining device 1, following machining by a tool. The longer the air blow time at the machining device 1, the smaller the amount of cutting fluid attached to the workpiece W at a time point of pick-up from the machining device 1. The control device 4 acquires the air blow time at the machining device 1 from the machining device 1, and determines the air blow time A in such a way that the longer the air blow time at the machining device 1, the shorter the air blow time A becomes. The air blow time A may thus be optimized according to the state of the workpiece W.

Performing air blow in two stages inside and outside the machining device 1 is particularly effective when the shape of the workpiece W is complex. For example, in the case of a cylindrical workpiece W or a workpiece W in which a long narrow hole such as a screw hole is formed, it is difficult to blow off cutting fluid inside the workpiece W by air blow at the machining device 1. Accordingly, a dedicated air-blowing device 2 which is designed according to the shape of the workpiece W becomes necessary. Cutting fluid may be more reliably removed from the workpiece W by blowing off the cutting fluid on an outer surface of the workpiece W by air blow at the machining device 1, and then, blowing off the cutting fluid inside the workpiece W by air blow by the air-blowing device 2 outside the machining device 1.

In the present embodiment, the machining device 1 is a machine tool, but the machining device 1 may alternatively be another type of machining device. Contents of post-processing that is necessary after machining are different depending on contents of machining that is performed on the workpiece W by the machining device 1. Accordingly, the machining system 10 may include a different post-processing device instead of the air-blowing device 2.

For example, the machining device 1 may be a molding device that molds a rubber workpiece W by thermally processing a material in a vulcanizing mold, and the post-processing device may be a deburring device that deburrs the workpiece W removed from the mold.

Generally, deburring is more facilitated, the higher the temperature of the workpiece W. The control device 4 acquires, as information regarding the state, at the machining device 1, of the workpiece W after machining, an elapsed time from opening of the mold, or an elapsed time from removal of the workpiece W from the mold at the machining device 1, for example. The longer the elapsed time, the lower the temperature of the workpiece W. The control device 4 determines a processing time for deburring in such a way that the shorter the elapsed time, the shorter the processing time for deburring becomes. The control device 4 may acquire, from the machining device 1, information regarding the temperature of the workpiece W instead of the elapsed time, and may determine the processing time in such a way that the higher the temperature of the workpiece W, the shorter the processing time for deburring becomes.

The processing time for deburring may thus be optimized according to the state of the workpiece W, and the task efficiency may be increased and the cycle time may be reduced.

Figure 4:
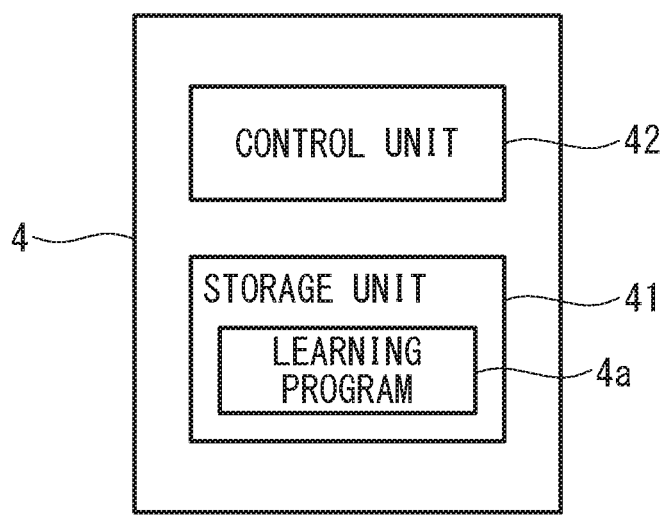
FIG. 4 is a configuration diagram of a modification of a control device of the machining system in FIG. 1.

In the embodiment described above, the control device 4 may include a learning function of performing learning to optimize a processing time for post-processing of the workpiece W on the basis of the information regarding the state of the workpiece W after machining, the processing time of post-processing performed by the post-processing device, and the state of the workpiece W after the post-processing. For example, as shown in FIG. 4, a learning program (a learning unit) 4a may be stored in a storage unit 41 of the control device 4, and a control unit 42 of the control device 4 may perform learning on the basis of the learning program 4a.

For example, in learning, the control unit 42 creates a table or a formula associating the information regarding the state of the workpiece W after machining and the post-processing time for the workpiece, and stores the created table or formula in the storage unit 41. The control unit 42 performs checking against each other of a relationship between the information regarding the state of the workpiece W after machining and the post-processing time for the workpiece W and the state of the workpiece W after the post-processing, on the basis of the table or the formula stored in the storage unit 41, and obtains the processing time, for post-processing, which is optimal for each state of the workpiece W after machining. The state of the workpiece W after the post-processing is determined by an inspection device or a worker in an inspection step performed after air blow, and the determination result is input to the control device 4 and is stored in the storage unit 41.

For example, in the case where the post-processing is air blow on a machined workpiece W, a table or a formula associating the elapsed time T and the air blow time A is created. Then, the relationship between the elapsed time T and the air blow time A and presence/absence of cutting fluid on the workpiece W after air blow are checked against each other, and a minimum required air blow time A for completely blowing off the cutting fluid is obtained for each elapsed time T.

Figure 5:
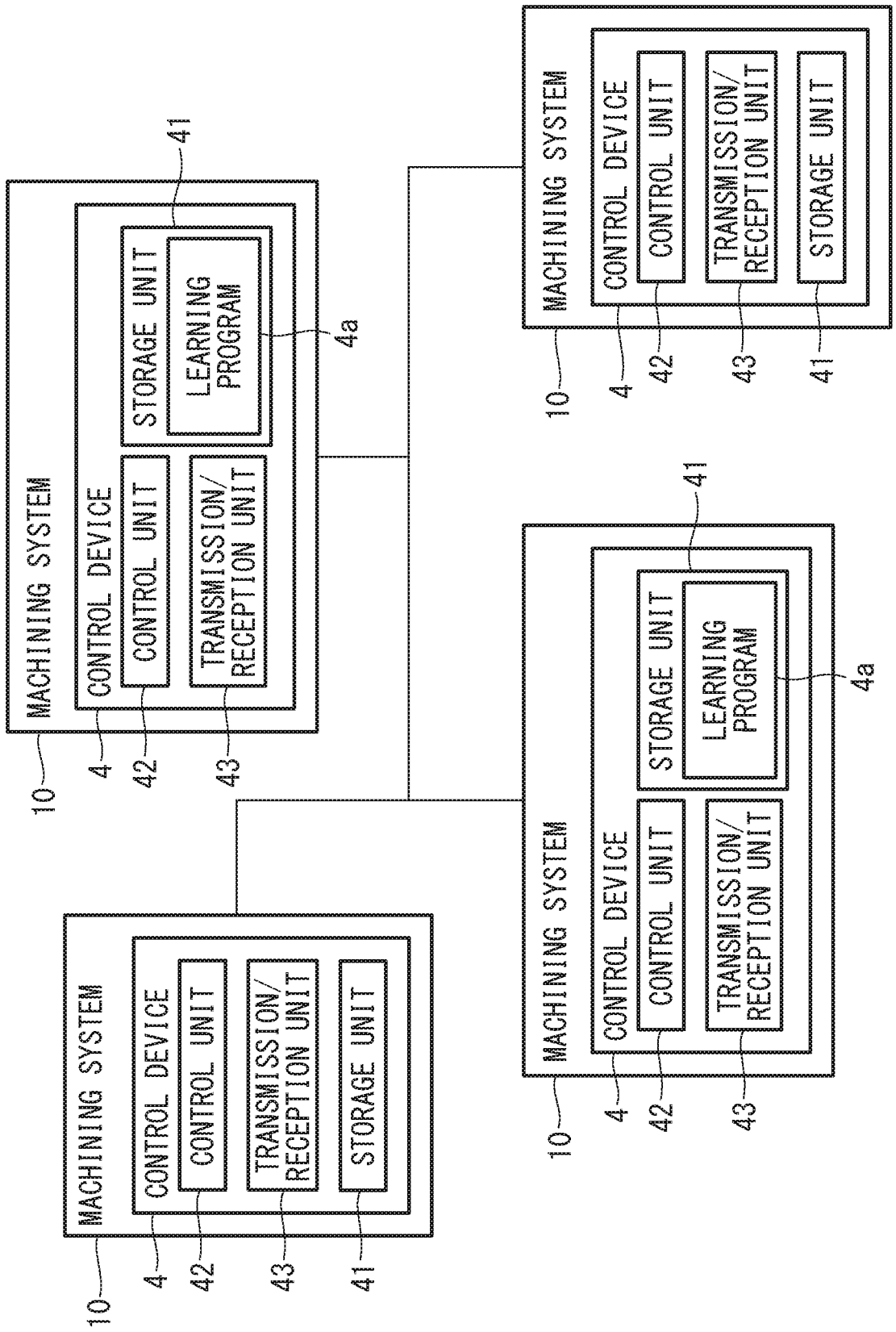
FIG. 5 is a diagram showing example connection between the control device in FIG. 4 and other control devices.

As shown in FIG. 5, the control device 4 including the learning function may be connected to the control devices 4 of other machining systems 10, and may provide the result of learning to the other control devices 4. The result of learning includes the table or the formula described above, and the state of the workpiece W after post-processing. In this case, the control device 4 includes a wireless or wired transmission/reception unit (an output unit) 43, and transmits the result of learning stored in the storage unit 41 to another control device 4 by the transmission/reception unit 43. The other control device 4 may use the received result of learning to perform learning to optimize the processing time for post-processing. In the case where the other control device 4 does not include the learning function, the control device 4 may provide, as the result of learning, the optimal processing time for post-processing to the other control device 4. Furthermore, the control device 4 may receive a result of learning from the other control device 4, and may use the received result of learning to perform learning to optimize the processing time for post-processing.

Figure 6:
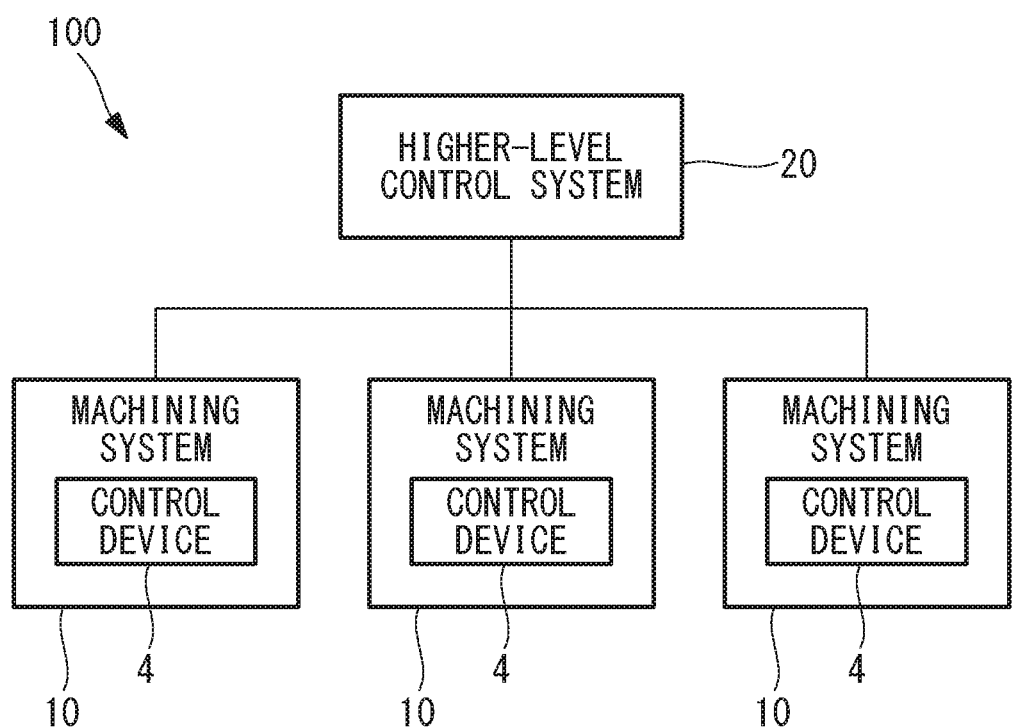
FIG. 6 is an overall configuration diagram of a management system according to another embodiment of the present invention.

As shown in FIG. 6, the control device 4 may be an edge device of a management system 100. The management system 100 includes a plurality of machining systems 10, and a higher-level control system 20 connected to each of the control devices 4 of the plurality of machining systems 10 in a manner capable of communication. For example, the higher-level control system 20 may be a production management system, a shipping management system, a robot management system, or a department management system. The higher-level control system 20 includes a control unit including a processor and the like, a display device, a storage unit including a non-volatile storage, a ROM, a RAM and the like, and an input device which is a keyboard, a touch panel, an operator's panel or the like, for example. The higher-level control system 20 may be a cloud server.

Each control device 4 included in the management system 100 may, but does not have to, include the learning function. The higher-level control system 20 receives, from the plurality of control devices 4, learning data necessary to perform learning for optimization of the processing time for post-processing, accumulates the received learning data in the storage unit, and aggregates the accumulated learning data. The learning data includes data associating the information regarding the state of the workpiece W after machining, the post-processing time for the workpiece W, and the state of the workpiece W after post-processing. In the case of the control device 4 including the learning function, the result of learning is the learning data.

The higher-level control system 20 may transmit the aggregated learning data to the control device 4 including the learning function, and the control device 4 may use the aggregated learning data from the higher-level control system 20 to perform learning of the processing time for post-processing.

Alternatively, the higher-level control system 20 may perform learning to optimize the processing time for post-processing, by using the aggregated learning data, and may transmit the obtained optimal processing time for post-processing to each control device 4. The processing time for post-processing may thereby be optimized also at the machining system 10, the control device 4 of which does not include the learning function, by using the optimal processing time for post-processing provided by the higher-level control system 20.

From the above-described embodiment, the following invention is derived.

An aspect of the present invention is a post-processing method for a workpiece including: conveying, by a robot, a workpiece machined by a machining device, from the machining device to a post-processing device; acquiring information regarding a state, at the machining device, of the workpiece after machining; determining, by a control device, a processing time for post-processing of the workpiece by the post-processing device, on a basis of the information regarding the state of the workpiece after machining; and performing the post-processing on the workpiece by the post-processing device for just the processing time that is determined.

when machining by the machining device is finished, the workpiece is conveyed by the robot, from the machining device to the post-processing device, and post-processing is performed by the post-processing device. The optimal processing time for post-processing is different depending on the state of the workpiece picked up from the machining device. According to the present aspect, a processing time, for post-processing, that is optimal for the state of the workpiece is determined by the control device on the basis of the information regarding the state, at the machining device, of the workpiece after machining. Accordingly, a task efficiency may be increased, and a cycle time may be reduced.

In the aspect described above, the post-processing may be air blow, the information regarding the state of the workpiece after machining may be an elapsed time from end of machining of the workpiece to pick-up of the workpiece from the machining device by the robot, and an air blow time may be more reduced as the elapsed time is increased. For example, the air blow time may be calculated from the following equation.

$$A = B - C \times D$$

Here, A is the air blow time, B is a maximum air blow time, C is a cutting fluid reduction coefficient, and D is the elapsed time.

When the elapsed time at the machining device from the end of machining to pick-up is increased, more cutting fluid, which is attached to the workpiece, flows off the workpiece, and the amount of cutting fluid remaining on the workpiece is thereby reduced, and the air blow time necessary to blow off the cutting fluid remaining on the workpiece is reduced. According to the configuration described above, the optimal air blow time may be determined on the basis of the elapsed time, after machining, at the machining device.

Another aspect of the present invention is a machining system including: a machining device that machines a workpiece; a post-processing device that performs post-processing on the workpiece that is machined by the machining device; a robot that conveys the workpiece that is machined, from the machining device to the post-processing device; and a control device that controls the post-processing device and the robot, where the control device acquires information regarding a state, at the machining device, of the workpiece after machining, from the machining device, determines a processing time for post-processing of the workpiece on a basis of the information regarding the state of the workpiece after machining, and causes the post-processing device and the robot to perform the post-processing on the workpiece for just the processing time that is determined.

Another aspect of the present invention is a management system including: a plurality of machining systems including respective control devices; and a higher-level control system that is capable of communicating with each of the control devices of the plurality of machining systems, where each of the plurality of machining systems includes a machining device that machines a workpiece, a post-processing device that performs post-processing on the workpiece that is machined by the machining device, a robot that conveys the workpiece that is machined, from the machining device to the post-processing device, and the control device that controls the post-processing device and the robot, the control device of at least one of the machining systems includes a learning unit that performs learning to optimize a processing time for the post-processing of the workpiece, on a basis of information regarding a state of the workpiece after machining, and a state of the workpiece after the post-processing, and an output unit that outputs a result of the learning, and the higher-level control system accumulates the result of the learning received from the control device of the at least one of the machining systems.

REFERENCE SIGNS LIST

1 machining device
2 air-blowing device (post-processing device)
3 robot
4 control device
41 storage unit
42 control unit
4a learning program (learning unit)
43 transmission/reception unit (output unit)
10 machining system
20 higher-level control system
100 management system

The invention claimed is:

1. A post-processing method for a workpiece comprising:
   conveying, by a robot, a workpiece machined by a machining device, from the machining device to a post-processing device;
   acquiring information regarding a state, at the machining device, of the workpiece after machining;
   determining, by a control device, a processing time for post-processing of the workpiece by the post-processing device, on a basis of the information regarding the state of the workpiece after machining, wherein the information regarding the state of the workpiece after machining is an elapsed time from end of machining of the workpiece to pick-up of the workpiece from the machining device by the robot; and
   performing the post-processing on the workpiece by the post-processing device for just the processing time that is determined.

2. The post-processing method for a workpiece according to claim 1, wherein:
the post-processing is air blow; and
an air blow time is more reduced as the elapsed time is increased.

3. The post-processing method for a workpiece according to claim 2, wherein the air blow time is calculated by:

$$A = B - C \times D, \text{ wherein}$$

A is the air blow time,
B is a maximum air blow time,
C is a cutting fluid reduction coefficient, and
D is the elapsed time.

4. The post-processing method for a workpiece according to claim 1, wherein the machining device comprises a tool for cutting the workpiece.

5. The post-processing method for a workpiece according to claim 1, wherein the post-processing device comprises an air blowing device.

6. A machining system comprising:
a machining device that machines a workpiece;
a post-processing device that performs post-processing on the workpiece that is machined by the machining device;
a robot that conveys the workpiece that is machined, from the machining device to the post-processing device; and
a control device that controls the post-processing device and the robot, wherein the control device:
acquires information regarding a state, at the machining device, of the workpiece after machining, from the machining device;
determines a processing time for post-processing of the workpiece on a basis of the information regarding the state of the workpiece after machining, wherein the information regarding the state of the workpiece after machining is an elapsed time from end of machining of the workpiece to pick-up of the workpiece from the machining device by the robot; and
causes the post-processing device and the robot to perform the post-processing on the workpiece for just the processing time that is determined.

7. The machining system according to claim 6, wherein the control device includes a learning unit that performs learning to optimize the processing time for the post-processing of the workpiece, on a basis of the information regarding the state of the workpiece after machining, a processing time of the post-processing performed by the post-processing device, and a state of the workpiece after the post-processing.

8. The machining system according to claim 7, wherein the control device further includes an output unit that outputs a result of the learning.

9. The machining system according to claim 8, wherein the control device is configured to output the result of the learning to a higher-level control system, and receive a result of learning from the higher-level control system.

10. The machining system according to claim 8, wherein the output unit comprises a transmission/reception unit.

11. The machining system according to claim 7, wherein the control device is configured to output a result of the learning to a control device of another machining system, and receive a result of learning from the control device of the other machining system.

12. The machining system according to claim 7, wherein the learning unit comprises a learning program stored in a storage unit.

13. The machining system according to claim 6, wherein the machining device comprises a tool for cutting the workpiece.

14. The machining system according to claim 6, wherein the post-processing device comprises an air blowing device.

15. A management system comprising:
a plurality of machining systems including respective control devices; and
a higher-level control system that is capable of communicating with each of the control devices of the plurality of machining systems, wherein each of the plurality of machining systems includes:
a machining device that machines a workpiece;
a post-processing device that performs post-processing on the workpiece that is machined by the machining device;
a robot that conveys the workpiece that is machined, from the machining device to the post-processing device; and
the control device that controls the post-processing device and the robot;
the control device of at least one of the machining systems includes:
a learning unit that performs learning to optimize a processing time for the post-processing of the workpiece, on a basis of information regarding a state of the workpiece after machining, and a state of the workpiece after the post-processing, wherein the information regarding the state of the workpiece after machining is an elapsed time from end of machining of the workpiece to pick-up of the workpiece from the machining device by the robot; and
an output unit that outputs a result of the learning; and
the higher-level control system accumulates the result of the learning received from the control device of the at least one of the machining systems.

16. The management system according to claim 15, wherein the higher-level control system is configured to transmit, to each of the control devices, a result of learning performed by the higher-level control system using the result of the learning.

17. The management system according to claim 15, wherein the higher-level control system is configured to transmit, to a control device not including a learning function, the result of the learning or a result of learning performed by the higher-level control system using the result of the learning.

18. The management system according to claim 15, wherein the learning unit comprises a learning program stored in a storage unit.

19. The management system according to claim 15, wherein the output unit comprises a transmission/reception unit.

* * * * *